US011580252B2

(12) United States Patent
Zibuschka et al.

(10) Patent No.: US 11,580,252 B2
(45) Date of Patent: Feb. 14, 2023

(54) METHOD FOR CONTROLLING USER INFORMATION IN AN AUTOMATICALLY LEARNING DEVICE

(71) Applicant: Robert Bosch GmbH, Stuttgart (DE)

(72) Inventors: Jan Zibuschka, Magstadt (DE); Michael Dorna, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 1264 days.

(21) Appl. No.: 15/840,261

(22) Filed: Dec. 13, 2017

(65) Prior Publication Data

US 2018/0173892 A1 Jun. 21, 2018

(30) Foreign Application Priority Data

Dec. 19, 2016 (DE) .......................... 102016225366.2

(51) Int. Cl.
| | |
|---|---|
| *G06F 21/62* | (2013.01) |
| *G06N 20/00* | (2019.01) |
| *G06Q 30/02* | (2012.01) |
| *G06N 5/04* | (2006.01) |
| *G06Q 30/0201* | (2023.01) |

(Continued)

(52) U.S. Cl.
CPC ......... *G06F 21/6245* (2013.01); *G06N 5/046* (2013.01); *G06N 20/00* (2019.01); *G06Q 30/0201* (2013.01); *G06Q 30/0251* (2013.01)

(58) Field of Classification Search
CPC ............ G06F 21/6245; G06F 21/6254; G06Q 30/0201; G06Q 30/0251–30/0258; G06Q 30/0269; G06Q 30/0271; G06N 20/00; G06N 20/20; G06N 5/046; G06N 7/02
See application file for complete search history.

(56) References Cited

U.S. PATENT DOCUMENTS

| | | | |
|---|---|---|---|
| 7,219,123 B1 * | 5/2007 | Fiechter ............ | H04M 1/72561 704/E15.045 |
| 7,698,250 B2 | 4/2010 | Dwork et al. | |
| 10,417,272 B1 * | 9/2019 | Carmack ................ | G06F 16/955 |

(Continued)

FOREIGN PATENT DOCUMENTS

WO WO-2016109540 A1 * 7/2016 ............ B60W 50/14

OTHER PUBLICATIONS

Yinzhi Cao and Junfeng Yang, Towards Making Systems Forget with Machine Unlearning, Jul. 20, 2015, IEEE Symposium on Security and Privacy, 2015, p. 463-480 (Year: 2015).*

*Primary Examiner* — Ann J Lo
*Assistant Examiner* — Leonard A Sieger
(74) *Attorney, Agent, or Firm* — Norton Rose Fulbright US LLP; Gerard Messina

(57) ABSTRACT

A method in which user information is transmitted from at least one data source to a processing unit of a learning device. The user information is used, by the processing unit via a machine learner, to generate at least one user model. The at least one user model is adapted via an adaptation of parameters used by the at least one machine learner to generating the at least one user model. The parameters, used by the at least one machine learner for generating the at least one user model, are adapted as a function of at least one predefined rule. The user model generated on the basis of the adapted parameters is used to personalize at least one terminal.

19 Claims, 2 Drawing Sheets

(51) Int. Cl.
*G06Q 30/0251* (2023.01)
*G06N 5/046* (2023.01)

(56) References Cited

U.S. PATENT DOCUMENTS

| | | | | |
|---|---|---|---|---|
| 2008/0209350 | A1* | 8/2008 | Sobotka | G06F 3/0482 |
| | | | | 715/762 |
| 2008/0243815 | A1* | 10/2008 | Chan | G06Q 30/0641 |
| 2015/0142560 | A1* | 5/2015 | Singh | G06Q 30/0261 |
| | | | | 705/14.53 |
| 2016/0034696 | A1* | 2/2016 | Jooste | H04L 63/104 |
| | | | | 726/1 |
| 2016/0352712 | A1* | 12/2016 | Tamp | H04L 63/08 |
| 2016/0379105 | A1* | 12/2016 | Moore, Jr. | G06F 21/316 |
| | | | | 706/11 |
| 2017/0308909 | A1* | 10/2017 | Faith | G06K 9/00315 |

* cited by examiner

METHOD FOR CONTROLLING USER INFORMATION IN AN AUTOMATICALLY LEARNING DEVICE

CROSS REFERENCE

The present application claims the benefit under 35 U.S.C. § 119 of German Patent Application No. DE 102016225366.2 filed on Dec. 19, 2016, which is expressly incorporated herein by reference in its entirety.

FIELD

The present invention relates to a method for controlling user information in an automatically learning system and a device for controlling user information.

BACKGROUND INFORMATION

Systems that develop mathematical models of users on the basis of user information, i.e., information which has been collected by a user and, if applicable, which relates to the privacy of the user, which has been collected to a large extent via sensors or terminals, and is used for personalizing, for example, smartphones or programs, are increasing in number and complexity.

The processing of user information is of major relevance, in particular, in the area of the so-called "Internet of Things" and in the area of services such as, for example, individual health care or networked transportation. Particularly useful information about a user in these areas may be ascertained by a fusion of multiple user profiles, which have been developed, for example, by a multiplicity of different terminals or service providers.

Significant problems, for example, with respect to data protection or a protection of a privacy of a user, arise as a result of the processing of user information with the aid of technical devices. Some conventional devices for protecting the privacy of a user, in particular, suppress or delete the collected user information already before processing by a device such as, for example, a machine learner. Such suppression or deletion methods, however, result in a loss of precision to be achieved by respective, collected user information when adjusting a machine learner, since the user information has no influence at all on the machine learner and on respective user models developed by the machine learner.

Some conventional methods for analyzing user information protect the privacy of a user by anonymizing detailed user information and supplement it, for example, with random data, so that it becomes impossible to associate findings ascertained on the basis of such data with a respective user.

Some conventional approaches operate with the aid of distributed machine learners, and generate the encrypted results that are used by a central management unit, in order to ascertain general findings about a population of users.

A method for ascertaining a privacy value, on the basis of which an output of information about a user is controlled by a system, is described in U.S. Pat. No. 7,698,250 B2.

SUMMARY

An example method and an example device in accordance with the present invention are provided. Specific embodiments of the present invention are described herein.

A machine learner in the context of the present invention is understood to mean a module, which recognizes patterns and/or principles in a data set with the aid of a mathematical function.

The introduced present invention is used, in particular, to delete user information from an automatically learning device, i.e., a device that uses machine learners for processing user information. In this case, it is provided that the user information is not only deleted from the device, but the machine learner used by the device and/or the user models developed by the machine learner are purged of the user information.

To purge user information from machine learners and/or user models of a device, it is provided, in particular, that the machine learners are provided only with user information that corresponds to a predefined rule, which is predefined, for example, by a user or by a management program. This means that the machine learners are supplied only with information that is not excluded by the rule.

In order to also purge machine learners used by a device and/or user models of user information, which has previously been processed by respective machine learners and/or user models, i.e., in order to reverse an influence of user information on a device, it is provided, in particular, that machine learners and/or user models are at least partially re-created or retrained on the basis of user information corresponding to respective predefined rules. In this case, the user information corresponding to the predefined rules may only include user information, which remains after a selection or deletion takes place as a function of the predefined rules, or which are supplemented by additional data such as, for example, predefined data or random data, after the selection or deletion has taken place as a function of the predefined rules.

It is possible that an abbreviated training as opposed to a completely new training is used in order to adapt a machine learner to the user information corresponding to the respective rules. For this purpose, only those parts of the machine learner, for example, may be retrained, which have changed due to predefined rules.

The presented method provides, in particular, that user information detected by at least one data source such as, for example, a sensor, an Internet browser or a smartphone, is conveyed to a processing unit, i.e., stored, for example, in a memory or provided or "streamed" in an instantaneous data stream. It is further provided that an influence of user information ascertained by the at least one data source on the computing operations carried out by the processing unit for personalizing a terminal such as, for example, computing operations for designing a machine learner and/or for providing a user model, is at least partially reversed or suppressed.

To suppress an influence of user information on a machine learner and/or on a user model, it is provided that a rule for suppressing user information is provided, with which, for example, a user establishes that user information about its buying behavior at a particular Internet merchant that has been collected, is to have no influence on its user data or on user models developed by the user. Based on the rule provided by the user, parameters of respective user information about the user collected by various data sources for processing are changed, in such a way that the user information affected by the rule, i.e., for example, user information collected during a purchase with an Internet merchant, are not considered by the machine learner or considered in a manner that is changed compared to a standard procedure, or do not contribute to a change of user models developed with the aid of the machine learner. This means that a device that processes the user information collected by the user remains in a state, in which the information collected during the purchase with the Internet merchant is disregarded.

In order to change the parameters of a machine learner, i.e., for example, statistical properties of mathematical formulas used to process user information, in such a way that the machine learner processes user information provided by at least one data source in accordance with a respective, predefined rule, it is provided, in particular, that the parameters are treated mathematically as if the parameters are subject to a so-called "concept drift," i.e., an unforeseen change over time. In such case, a point in time of an occurrence of such a "concept drift" is known, for example, by creating a respective, predefined rule and may be used in correcting the parameters of the machine learner. The methods described below may be used to correct parameters with respect to such a "concept drift" in accordance with at least one predefined rule.

On the one hand, the parameters of a machine learner or of a user model may be used with the aid of so-called "ensemble methods," in which a finite number of learning algorithms are employed. A user model may be ascertained, for example, for each class of a plurality of classes developed on the basis of respective user information. In such case, the models that have been developed on the basis of user information from a class which, in accordance with a respective predefined rule, is not intended to be considered when ascertaining a user model, are rejected.

On the other hand, the parameters of a machine learner or of a user model may be corrected by segmenting the data and by limiting them to one particular area, for example, a time window (so-called "windowing"). In this case, it is provided, for example, that a machine learner is retrained on the basis of at least one portion of user information, which has been selected in accordance with a predefined rule.

In this process, concepts or models learned by a machine learner in the past may, for example, be relearned by, for example, feeding randomized data, pseudo-randomized data or predefined data from a standard dataset as training data to the machine learner and forcing data to be excluded in accordance with the predefined rule, which have potentially already been used for training the machine learner, out of the machine learner. Accordingly, a change of a user model may be triggered by the user model obtaining random values as input values. As a result of the random values, previously learned connections or training data are unlearned.

In the event that the source of user information is indicated by models underlying a respective machine learner, or particular user data may be assigned to various components of a machine learner, it is possible to selectively change the user information that is intended to be deleted or suppressed in accordance with a predefined rule. For this purpose, weightings of assignments by models underlying a machine learner may be adapted to a value, which corresponds to the predefined rule, for example, a very low value. In addition, particular models underlying the machine learner, as well as connections between various models underlying the machine learner, may be removed.

Furthermore, in the event that the source of user information is indicated by models underlying a respective machine learner, or particular user data may be assigned to various components of a machine learner, particular outputs of a personalization module of a corresponding device including the machine learner may be suppressed as a function of a predefined rule. When it has been detected, for example, that an output of a machine learner is based completely or partially on data to be deleted in accordance with a predefined rule, the output may be partially or completely suppressed. All outputs or merely outputs selected as a function of the predefined rule may be suppressed as a function of the predefined rule, i.e., excluded from further use such as, for example, from a personalization of a terminal.

Outputs of a user model or of a personalization module of a device including a machine learner, which have been ascertained, for example, on the basis of past user information, which, however, are to be deleted in accordance with a predefined rule, may also be suppressed, i.e., excluded from an output on an output unit.

Alternatively, such outputs of a user model or of a personalization module including a machine learner, which have been ascertained on the basis of user information, which are assigned classes that are to be deleted in accordance with a predefined rule, may also be suppressed.

All outputs to be suppressed may, of course, also be filtered, for example, as a function of a detection time of respective user information, so that only information that cannot be connected to user information that has been detected within a time window predefined by a rule is output.

The methods described above may also be combined in a so-called "ensemble learning" approach, in order to correct the parameters of a machine learner with respect to a change contrary to a predefined rule, and to subsequently suppress an output of information that is to be deleted in accordance with the predefined rule. A user experience may be optimized by a suppression of information to be output by the machine learner, which is connected to a change of a machine learner or is additionally provided, or by a personalization model including the machine learner. For this purpose, a display of information to be deleted in accordance with a predefined rule may also be avoided if this information is to be output by a device or on the basis of a random selection that is independent of a user model used or of a personalization used. This means that the user is not supplied with information, which is related to user information to be deleted in accordance with a predefined rule, even if this information were to be displayed, for example, on the basis of a random selection and accordingly selected independently of user information of the user.

The presented method enables a user a complete control of the use of its user information in an automatically learning device, for example, in a networked device or in a device used solely for data analysis such as, for example, a so-called "backend." For this purpose, it is provided that if the user decides to delete user information in the automatically learning device, the models and machine learners underlying the device are changed, i.e., are adapted to a state, which corresponds to a state in which the user information has not been considered by the device.

It is further provided that, if necessary, an output layer is used, which purges information to be output by the device, by excluding respective information to be output at least partially from an output on an output unit, while taking information that is output by a machine learner of the device into consideration.

The presented method may be used, in particular, in combination with traditional information security devices or privacy settings, as they are typically used in the area of so-called "ubiquitous computings" or in the area of the so-called "Internet of Things." As such, the presented method enables a transparent and continuous management of user information in these areas. For this purpose, the user may control and, if necessary, edit user information, which he/she him/herself has conveyed to a device and user information, which has been ascertained by the device as a function of user information conveyed by the user.

The automatic learning capability of a device is not limited by the presented method and neither is a usefulness of user information ascertained by such a device limited. With a selective deletion of user information in accordance with a predefined rule, it is possible to avoid a completely new training on a completely new data set, which is generally time-consuming and technically complex.

The present invention further relates to a device for controlling user information, including at least one data source for detecting user information, at least one processing unit for managing at least one machine learner and a control component, the at least one machine learner being configured to develop at least one user model on the basis of the user information detected with the aid of the at least one data source, and the control component being configured to adapt the at least one user model as a function of at least one predefined rule via an adaptation of the parameters, which are used by the at least one machine learner for generating the at least one user model, and to provide at least one adapted user model for personalizing at least one terminal generated on the basis of adapted parameters.

The presented device is used, in particular, for carrying out the presented method and includes, for example, a processing unit for managing a digital assistant. For this purpose, the presented device may automatically select and carry out one of the specific embodiments of the presented method described above.

Additional advantages and embodiments of the present invention result from the description and the figures.

It is understood that the features described above and those described below are applicable not only in the respectively indicated combination, but also in other combinations or alone, without departing from the scope of the present invention.

DETAILED DESCRIPTION OF EXAMPLE EMBODIMENTS

The present invention is schematically depicted in the figures on the basis of specific embodiments and is described in greater detail below with reference to the figures.

Figure 1:
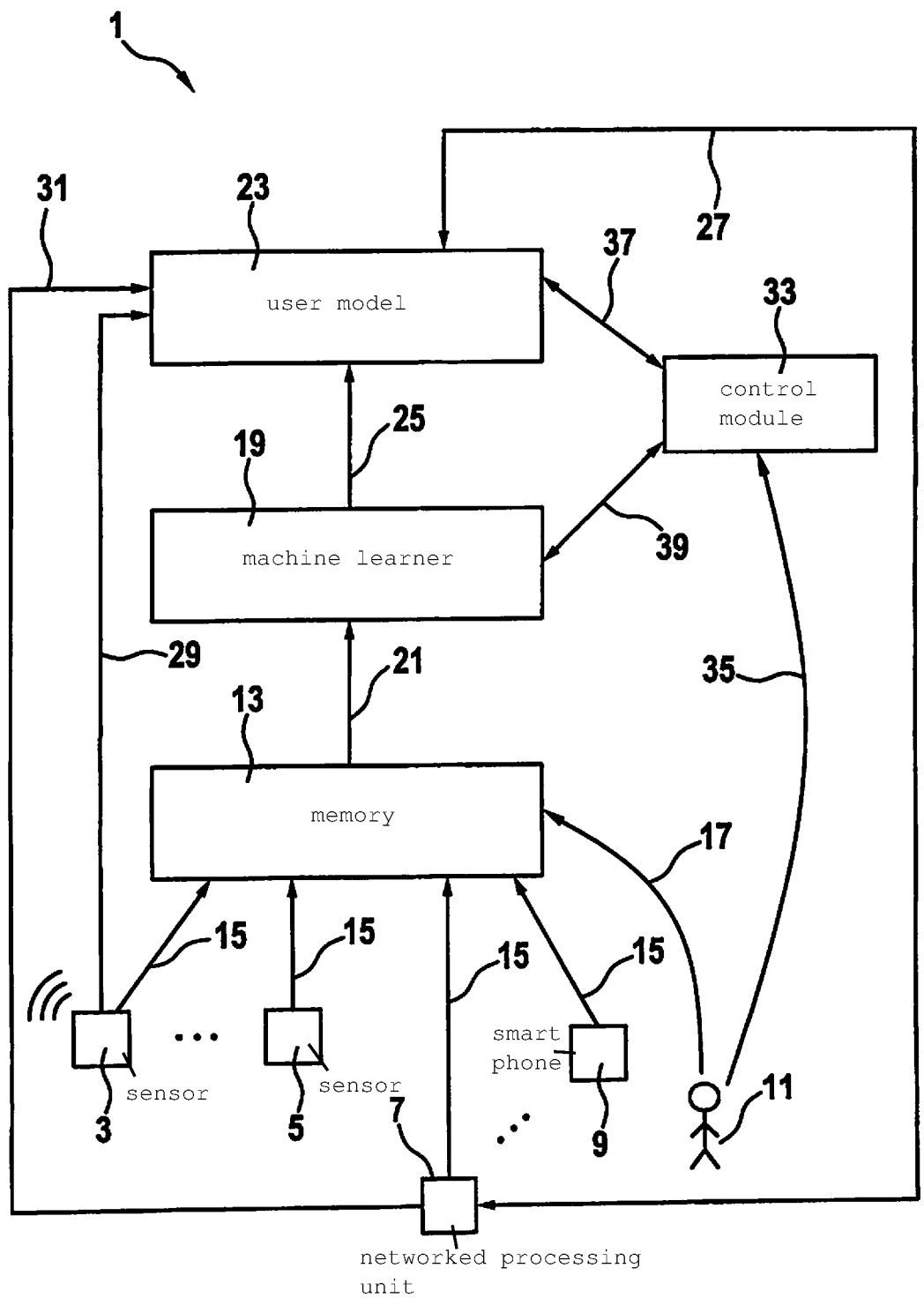
FIG. 1 schematically shows a depiction of a possible embodiment of the presented device.

A device 1 for processing user information is depicted in FIG. 1. User information is ascertained by a user 11 and is transmitted to a memory 13 with the aid of sensors 3 and 5 and with the aid of a networked processing unit 7 of a terminal such as, for example a vehicle and a smartphone 9, as indicated by arrows 15. The information transmitted to memory 13 includes both the user information, i.e., information about the user, which has been provided, for example, by the user or has been ascertained as a function of information provided by the user, as well as meta-information such as, for example, an identifier of a data source providing the information, a date stamp and information about what type of information is stored in the memory. Furthermore, user 11 may directly convey inputs to memory 13, for example, using a user interface, as indicated by arrow 17. The information stored in memory 13 is transmitted to a machine learner 19, as indicated by arrow 21. The machine learner, which may, for example, be an unsupervised machine learner such as, for example, an artificial neuronal network or a supervised machine learner, analyzes the user information transmitted from memory 13 and develops a user model 23 on the basis of the user information, as indicated by arrow 25. User model 23 is used to personalize a user interface of a program provided with the aid of processing unit 7, as indicated by arrow 27. Furthermore, the user model receives information from sensor 3, directly, for example, via a wireless interface, as indicated by arrow 29 and, for example, from processing unit 7 via a hard-wired interface, as indicated by arrow 31.

Accordingly, the information transmitted directly to user model 23 is not processed by machine learner 19.

User 11 searches, for example, for a book with the aid of a smartphone 9, but does not order the book immediately, since he/she has to go to a meeting. The user information about the book sought by user 11 is then transmitted by smartphone 9 to memory 13 and processed by machine learner 19. In the process, machine learner 19 assigns the book sought by user 11 a category of books and updates user model 23 to the effect that user 11 reads books of the ascertained category. Updated user model 23 is subsequently transmitted to processing unit 7, as indicated by arrow 27. Processing unit 7 is then used to search for additional books for user 11 of the ascertained category with the aid of machine learner 19 and to output to user 11 on a display unit.

To allow user 11 an option of excluding his/her user information from an update of user model 23, it is provided according to the presented method, that user 11 predefines a rule, which states, for example, that all user information about a buying behavior of user 11 obtained in a certain time period, shall not be used to generate personalized advertising.

The rule predefined by user 11 is conveyed by user 11 to a control module 33, i.e., for example, input via a user interface such as, for example, an Internet browser, as indicated by arrow 35. Control module 33 exchanges communication both with user model 23, as indicated by arrow 37, as well as with machine learner 19, as indicated by arrow 39. Control module 33 changes the parameters underlying machine learner 19, for example, by reducing to a minimum weightings of connections to information about purchases, which have been collected via user 11 in a time period specified by the user. Accordingly, the information collected in the time period specified by user 11 has no effect, or only a minimal effect, on user model 23. Control module 33 also searches user model 23 for information that is related to the user information specified via the rule by user 11 and, for example, which was already incorporated in user model 23 at an earlier point in time. Appropriate information is deleted from user model 23 by control module 33. Accordingly, user model 23 is not significantly changed by the search for the book, nor is it updated, so that user 11 is also not presented any advertising of books of the ascertained category by processing unit 7.

In order to avoid a random output of information, which corresponds to the information specified in the predefined rule by user 11, and in order to avoid a resulting uncertainty of user 11 regarding an implementation of his/her predefined rule, it is provided that an output control layer be provided in a program to be supplied by processing unit 7, which monitors all information to be output by the program supplied with the aid of processing unit 7 and excludes information from an output, which relates to the information specified in the rule by user 11.

Figure 2:
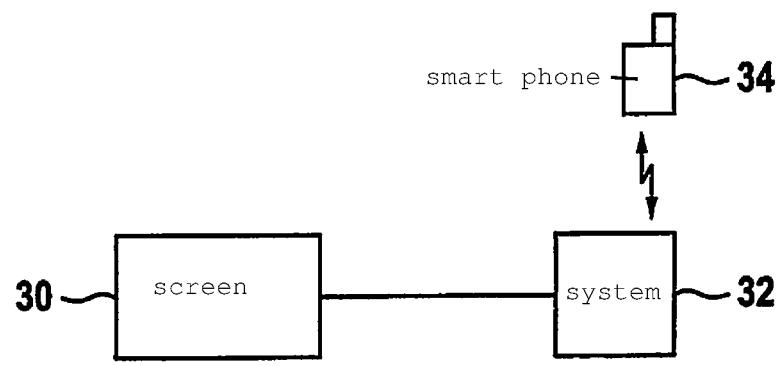
FIG. 2 shows a processing of a rule provided by a user according to a possible embodiment of the presented method.

FIG. 2 shows an input interface in the form of a browser displayed on a screen 30. A user may predefine a rule to a system 32, which applies and continually updates a user model of the user, as a function of which the system updates the user model of the user.

The user may, for example, activate an option via the browser, according to which a rule is predefined for system 32, which prohibits system 32 from processing information about an address of the user, which has been collected by devices connected to system 32 such as, for example, by a smartphone 34.

Since system 32 in the present case processes information collected by smartphone 34 with the aid of a machine learner in the form of an artificial neuronal network, i.e., a closed classification system, the machine learner in the present case cannot be adapted per se. Nevertheless, in order to adapt an adaptation of information processed by system 32 when creating the user model in such a way that the rule of the user is complied with at least on an output layer, i.e., the user is presented with no location-based information, it is provided that the information collected by smartphone 34, which relates to a location of the user, i.e., which includes the user's location or refers to the user's location, is not conveyed to the machine learner and/or is not used to update the user model. This means that an input layer and/or an output layer of the machine learner in the form of an artificial neuronal network is filtered with respect to location-related data. Accordingly, the user model is updated solely with the aid of parameters that include no location-related data, so that smartphone 34, which is updated using user information provided by the user model and, for example, downloads personalized advertisement information, presents the user only with advertisement information that is independent and free of location-related data. In the process, the rule, in accordance with which input data and/or output data of the machine learner is filtered, may of course, affect any additional user information such as, for example, a search behavior of the user or user preferences. Accordingly, it is also conceivable that a user predefines a rule, in accordance with which search queries carried out in a time period of, for example, one hour earlier until the present time, are not intended to result in a change of his/her user model. The result of such a rule is that system 32 updates user model independently of search queries made in the time period and the user, for example, may search for a computer system using a search engine without the user then being presented with advertising for computer systems.

What is claimed is:

1. A method for controlling user information in an automatically learning device, the method comprising:
predefining, by a user, at least one predefined rule;
transmitting user information related to the user from at least one data source to a processing unit of the learning device;
generating, by the processing unit using at least one machine learner, at least one user model based on the user information, the at least one user model being adapted via an adaptation of parameters used by the at least one machine learner for generating the at least one user model, and the parameters, used by the at least one machine learner for generating the at least one user model, being adapted as a function of the at least one predefined rule; and
personalizing at least one terminal using the user model generated on the basis of the adapted parameters;
wherein the at least one predefined rule predefined by the user includes instructions to exclude certain of the user information transmitted from the at least one data source from use by the at least one machine learner in the generation or adaption of the user model, the user information transmitted from the at least one data source and excluded from use by the at least one machine learner including information related to a purchasing behavior of the user.

2. The method as recited in claim 1, wherein the parameters used by the at least one machine learner for generating the at least one user model: (i) specify statistical properties of mathematical formulas used to process the user information, and/or (ii) specify connections to additional models.

3. The method as recited in claim 1, wherein information is excluded from an output in the event that the information, which is related to user information that is to be deleted in accordance with the at least one predefined rule, is to be output by the automatic learning device after an adaptation of the parameters of the at least one machine learner.

4. The method as recited in claim 1, wherein the parameters, which are used by the at least one machine learner for generating the at least one user model, are changed as a function of the at least one predefined rule in such a way that an adaptation of the at least one user model to the user information transmitted from the at least one data source is prevented.

5. The method as recited in claim 1, wherein the at least one predefined rule includes instructions for at least partially changing, during creation of the at least one user model, user information transmitted by the at least one data source.

6. The method as recited in claim 1, wherein, as a function of at least one predefined rule, at least one of: (i) various user models for various classes of user information are developed, and (ii) respective models are rejected.

7. The method as recited in claim 1, wherein already existing user models are redeveloped based on user information selected as a function of the at least one predefined rule.

8. The method as recited in claim 1, wherein respective user information selected as a function of the at least one predefined rule is supplemented by predefined information.

9. The method as recited in claim 1, wherein information to be output by the learning device is at least partially excluded from an output as a function of the at least one predefined rule.

10. A device for controlling user information, comprising:
at least one data source for detecting user information, the data source being a sensor, or an Internet browser, or a smartphone; and
at least one processing unit configured to manage at least one machine learner and a control component, the at least one machine learner being configured to generate, using parameters, at least one user model based on the user information detected with the aid of the at least one data source, and the control component being configured to adapt the at least one user model as a function of at least one predefined rule via an adaptation of the parameters used by the at least one machine learner for generating the at least one user model, and to configure the machine learner to supply at least one user model adapted based on the adapted parameters for personalizing at least one terminal;
wherein the at least one predefined rule is predefined by the user and includes instructions to exclude certain of the user information detected with the aid of the at least one data source from use by the at least one machine learner in the generation or adaption of the user model, the user information detected with the aid of the at least one data source and excluded from use by the at least one machine learner including information related to a purchasing behavior of the user.

11. The method as recited in claim 1, wherein the at least one data source is a sensor, or an Internet browser, or a smartphone.

12. The method as recited in claim 1, wherein the at least one machine learner is a module which recognizes patterns in a data set.

13. The method as recited in claim 1, wherein the excluded transmitted user information includes information related to a location of the user.

14. The method as recited in claim 1, wherein the user information transmitted from the at least one data source and excluded from use by the at least one machine learner includes information related to a search behavior of the user.

15. The device as recited in claim 10, wherein the parameters used by the at least one machine learner for generating the at least one user model: (i) specify statistical properties of mathematical formulas used to process the user information, and/or (ii) specify connections to additional models.

16. The device as recited in claim 10, wherein the at least one predefined rule includes instructions for at least partially changing, during creation of the at least one user model, user information transmitted by the at least one data source.

17. The device as recited in claim 10, wherein the at least one machine learner is a module which recognizes patterns in a data set.

18. The device as recited in claim 10, wherein the user information detected with the aid of the at least one data source and excluded from use by the at least one machine learner includes information related to a location of the user.

19. The device as recited in claim 10, wherein the user information detected with the aid of the at least one data source and excluded from use by the at least one machine learner includes information related to a search behavior of the user.

\* \* \* \* \*